(12) United States Patent
Townsend

(10) Patent No.: US 8,151,690 B2
(45) Date of Patent: Apr. 10, 2012

(54) PLUNGER WITH ANNULAR EXTERIOR SEALS AND METHOD OF INSTALLING ANNULAR SEALS ON AN EXTERIOR SURFACE OF A PLUNGER

(75) Inventor: Murray R. Townsend, Edmonton (CA)

(73) Assignee: Fourth Dimension Designs Ltd., Edmonton (CA)

( * ) Notice: Subject to any disclaimer, the term of this patent is extended or adjusted under 35 U.S.C. 154(b) by 938 days.

(21) Appl. No.: 12/173,216

(22) Filed: Jul. 15, 2008

(65) Prior Publication Data

US 2008/0309020 A1   Dec. 18, 2008

Related U.S. Application Data

(63) Continuation-in-part of application No. 11/349,443, filed on Feb. 7, 2006, now Pat. No. 7,401,544.

(30) Foreign Application Priority Data

Jul. 26, 2005   (CA) ........................................ 2515134

(51) Int. Cl.
*F01B 29/00* (2006.01)

(52) U.S. Cl. .............. 92/128; 92/169.1; 29/451; 29/700

(58) Field of Classification Search .................... 92/128, 92/169.1; 29/451, 700
See application file for complete search history.

(56) References Cited

U.S. PATENT DOCUMENTS

| 2,860,535 | A | * | 11/1958 | Fowler | 29/280 |
| 3,266,347 | A | * | 8/1966 | Robertson | 29/275 |
| 6,038,753 | A | * | 3/2000 | Willett | 29/235 |
| 6,148,923 | A |   | 11/2000 | Casey |  |
| 2005/0025644 | A1 |   | 2/2005 | Ford |  |
| 2007/0067978 | A1 |   | 3/2007 | Relan |  |

OTHER PUBLICATIONS

Internet pages, "System Seals", Piston Install Cone, and Simple Piston Seal Install Animation, Apr. 10, 2005.

* cited by examiner

*Primary Examiner* — Igor Kershteyn

(74) *Attorney, Agent, or Firm* — Davis & Bujold, P.L.L.C.

(57) ABSTRACT

A method of installing annular seals on a plunger. A first step involves positioning an annular seal on a seal installation tool adapted to hold the annular seal in an expanded state. A second step involves positioning the annular seal so that the annular seal overlies a body of a plunger. A third step involves transferring the annular seal from the seal installation tool to a seal groove in the body of the plunger.

6 Claims, 4 Drawing Sheets

PLUNGER WITH ANNULAR EXTERIOR SEALS AND METHOD OF INSTALLING ANNULAR SEALS ON AN EXTERIOR SURFACE OF A PLUNGER

FIELD

A plunger with annular exterior seals and a method of installing annular seals on an exterior surface of a plunger.

BACKGROUND

Gas lift plungers have a number of annular exterior seals. A joint is positioned at each seal location to allow the disassembly of the plunger, in order to facilitate installation of the annular seals. Each joint is a potential failure point for the plunger.

SUMMARY

According to one aspect, there is provided a plunger, which has a cylindrical body. All or at least a portion of the body is in one piece with more than one circumferential exterior seal groove. Replaceable annular seals are positioned in selected ones of the seal grooves.

According to another aspect there is provided a method of installing annular seals on a plunger. A first step involves positioning an annular seal on a seal installation tool adapted to hold the annular seal in an expanded state. A second step involves positioning the annular seal so that the annular seal overlies a body of a plunger. A third step involves transferring the annular seal from the seal installation tool to a seal groove in the body of the plunger.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
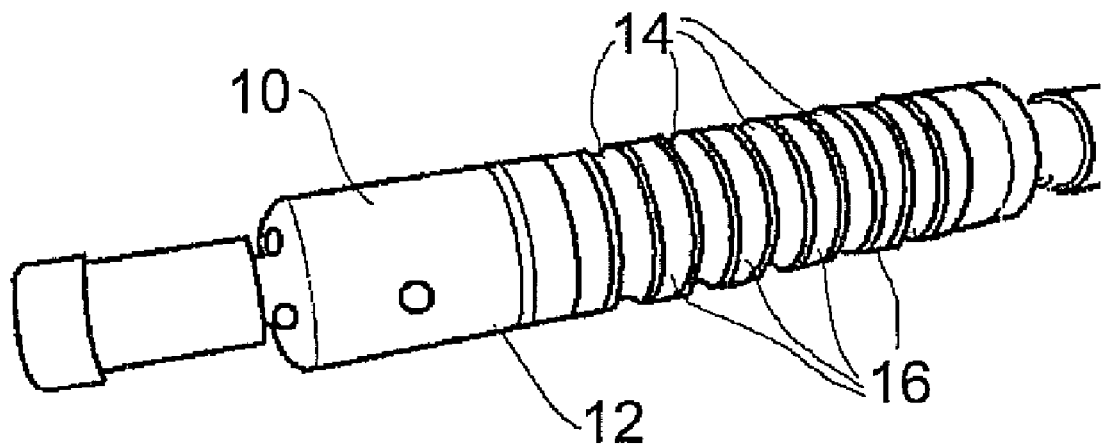
FIG. 1 is a perspective view of a plunger.

The preferred embodiment, a plunger generally identified by reference numeral 10, will now be described with reference to FIG. 1.

Plunger 10 has a cylindrical body 12. Body 12 is machined in one piece with numerous circumferential exterior seal grooves 14. Replaceable annular seals 16 made from elastomer are positioned in seal grooves 14. As depicted, annular seals 16 are positioned in every other seal groove 14. Plunger 10 has the distinct advantage of having no joints. It will be appreciated that it not essential that there be no joints. Benefits could be gained by simply reducing the number of joints. This is done by placing more than one of seal grooves 14 on each portion of more than one portion of body 12.

It would not be possible to make plunger 10, unless some method were developed for installing annular seals 16 onto a one piece body 12.

Figure 2:
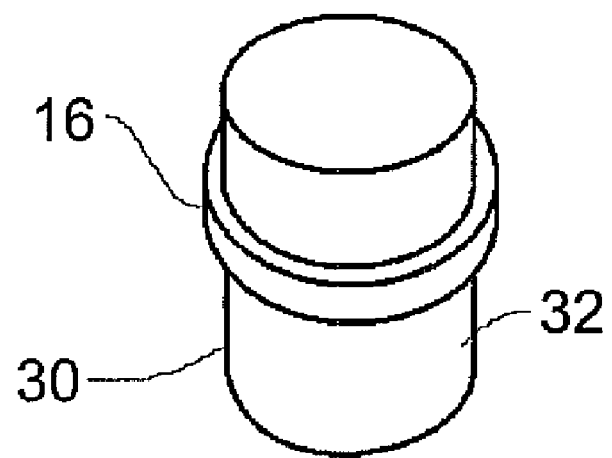
FIG. 2 is a perspective view of an elastomer seal being expanded by a truncated conical seal expanding member.
Figure 3:
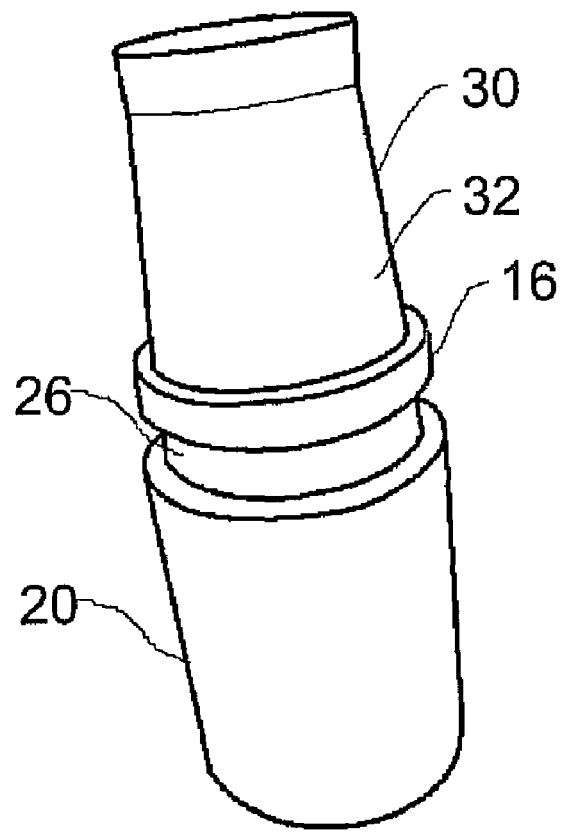
FIG. 3 is a side elevation view of the elastomer seal being transferred from the seal expanding member onto a seal installation tool.
Figure 4:
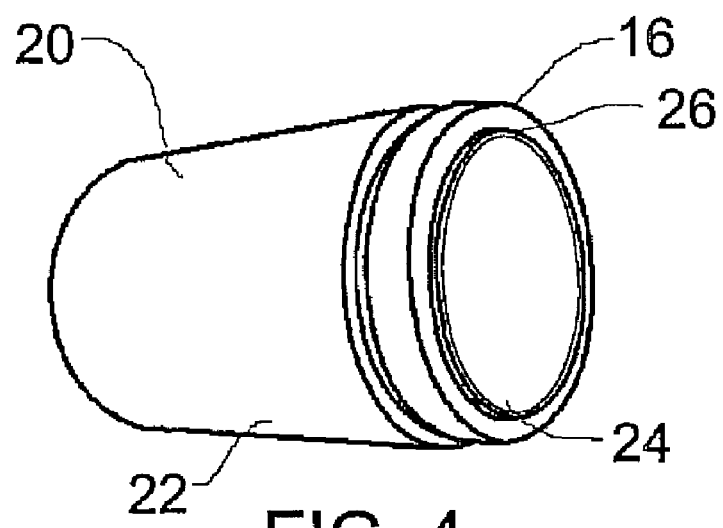
FIG. 4 is a perspective view of the elastomer seal mounted on the seal installation tool.
Figure 5:
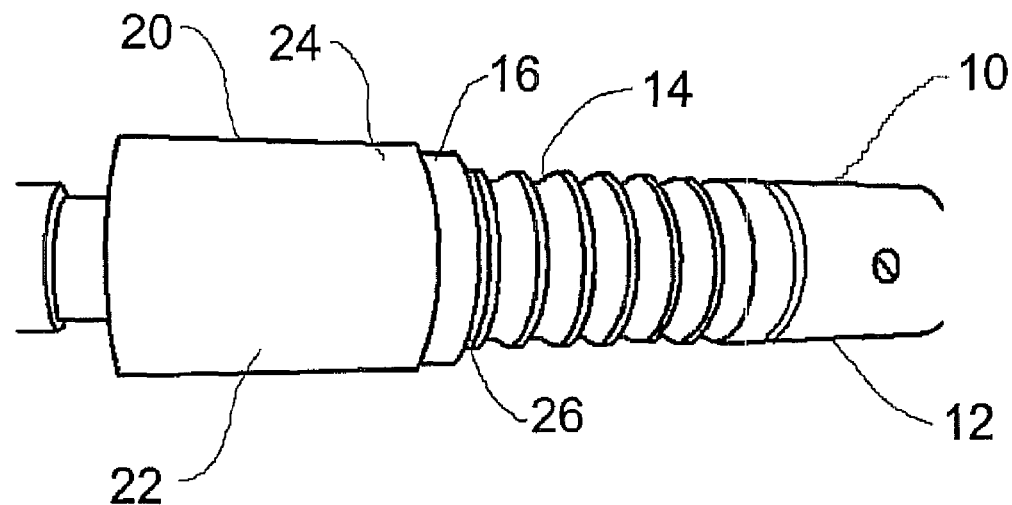
FIG. 5 is a side elevation view of the seal installation tool overlying a plunger body.
Figure 6:
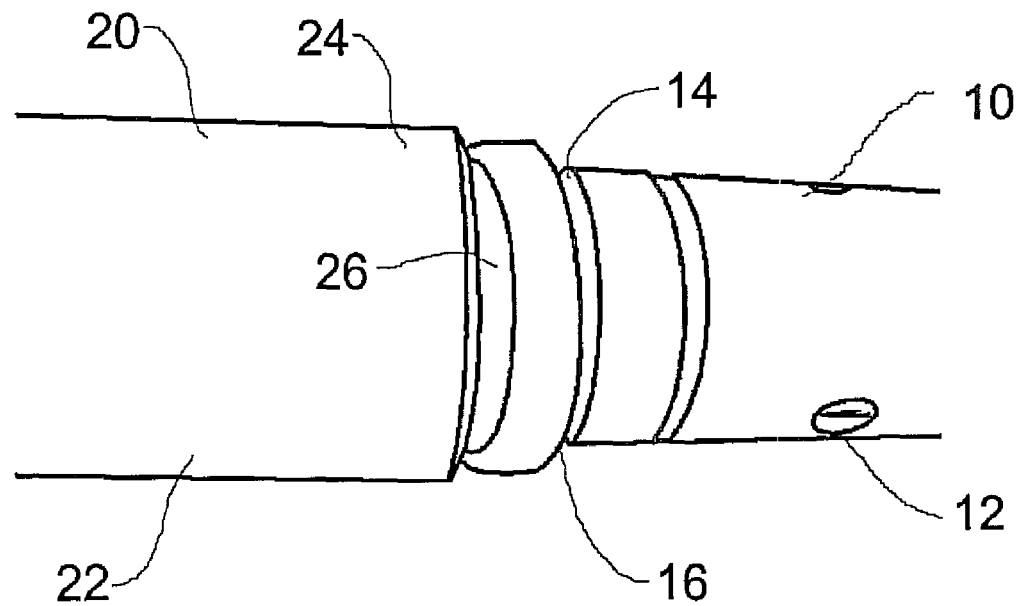
FIG. 6 is a side elevation view of the elastomer seal being transferred from the seal installation tool onto the plunger body.

Referring to FIGS. 2 through 6, there will now be described a preferred method of installing annular seals 16. Referring to FIG. 4, annular seal 16 is positioned on a seal installation tool 20. Seal installation tool 20 is adapted to hold annular seal 16 in an expanded state. Seal installation tool 20 can take a number of forms. The form selected for illustration is a sleeve-form body 22 with an exterior surface 24 on which is positioned a seal seat 26. Referring to FIG. 5, body 22 is positioned so that annular seal 16 overlies body 12 of plunger 10. Referring to FIG. 6, annular seal 16 is then transferred from seal installation tool 20 to one of seal grooves 14 on body 12 of plunger 10.

It will be appreciated that body 22 of seal installation tool 20 need not be in the form of a sleeve. It will also be appreciated that body 22 need not overlie plunger 10, as long as annular seal 16 does. It will also be appreciated that seal seat 26 can be discontinuous, as annular seal 16 could be just as effectively held in an expanded condition by a plurality of fingers arranged in a ring.

Referring to FIG. 2, a seal expanding member 30 has been developed for use in expanding annular seal 16. Seal expanding member 30 has a truncated conical body 32. It will be appreciated that body 32 need not be truncated, but only the lower portion of body 32 is needed to perform the expanding operation. An upper portion of body 32, does not serve a useful function if its outer diameter is smaller than the inner diameter of annular seal 16. It will be appreciated that the conical form is merely a convenient form of inclined plane shape to accomplish the desired objective. Other forms of inclined plane could be used to expand annular seal 16 onto seal seat 26. Referring to FIG. 3, once annular seat 16 is expanded it is transferred from seal expanding member 30 to seal seat 26 of seal installation tool 20 in preparation for installation, as described above.

Figure 7:
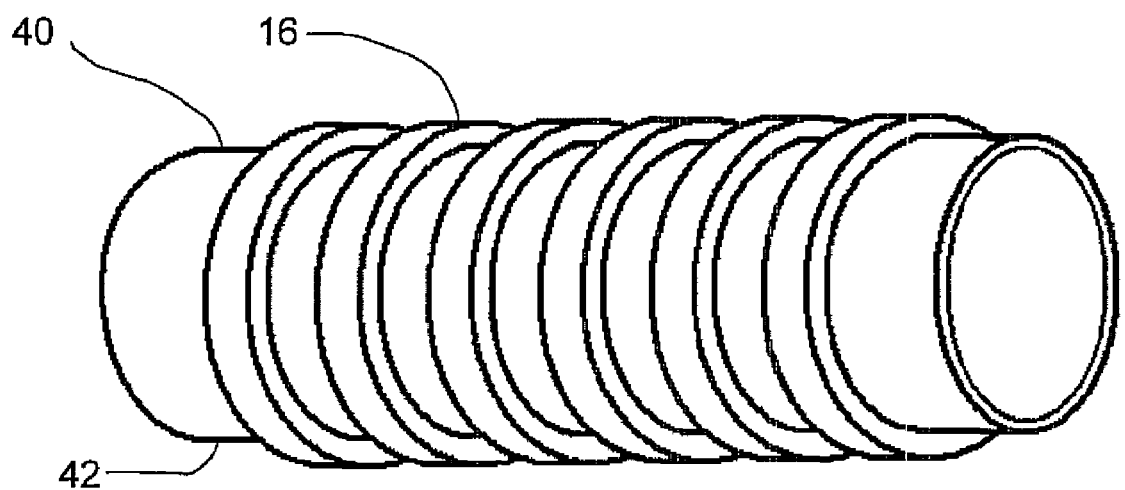
FIG. 7 is a perspective view of a seal carrier sleeve.

Variation:

Referring to FIG. 7, instead of the user providing seal expanding member 30 with an inclined plane to expand annular seal 16 and then transferring it to seal seat 26, an alternative way of providing expanded seals 16 is to provide an annular seal carrier sleeve 40, or seal cartridge, that is provided with a number of individual seals 16 positioned on an outer seal carrying surface 42. Seals 16 can then be slid off sleeve 40 onto the desired position on cylindrical body 12 of plunger 10. This may be done at a centralized location, such as a factory, which would allow the process to be automated, or to be accomplished using machinery or tools that would otherwise be impractical for economic or other reasons. For example, a supplier may purchase sleeves 40 from a manufacturer, which would then be sold to the individual users.

Figure 8:
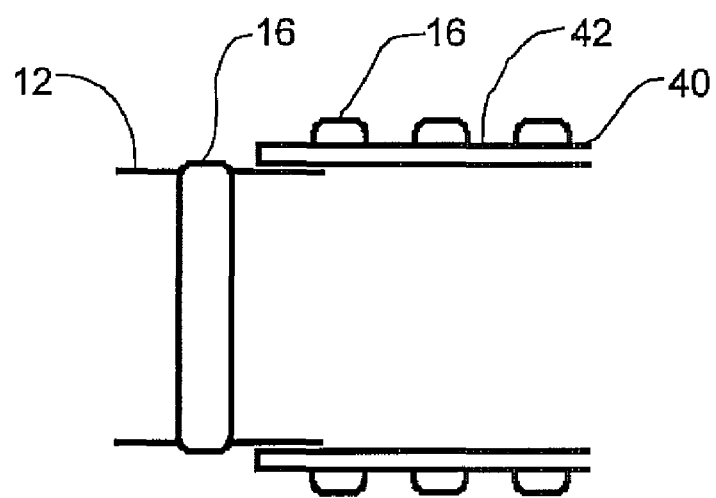
FIG. 8 is a side view in section of a seal carrier sleeve overlying a plunger.

The inner diameter of sleeve 40 is large enough to receive cylindrical body 12. Referring to FIG. 8, in addition to carrying seals 16, the inner diameter of sleeve 40 may be appropriately sized to be used as a test gauge, where if sleeve 40 is able to pass over the existing seals 16 on body 12, it is necessary to replace them. For example, when in a contracted state on cylindrical body 12, seals 16 may have a contoured outer surface, such as concave, convex, ribbed, etc. as is known in the art, such that there are at least two different diameters. As seals 16 are worn, the larger outer diameter is reduced to a point where the seals no longer operate in the desired manner. The inner diameter of sleeve 40 may be appropriately sized between the two outer diameters to properly determine when this point has been reached. This feature may also apply to seal installation tool 20 discussed above.

In this patent document, the word "comprising" is used in its non-liming sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A seal carrying sleeve, comprising:
    a tubular body having an outer surface defining a seal-carrying surface and an inner surface defining an inner bore having a diameter; and
    more than one plunger seal positioned on the seal-carrying surface for installing on the plunger body, the plunger seal being in an expanded state on the seal-carrying surface, and contracting to a contracted state when removed from the seal-carrying surface;
    the diameter of the inner bore being substantially the same as an outer diameter of the plunger seal in the contracted state.

2. The seal carrying sleeve of claim 1, wherein the plunger seal has an outer surface, the outer surface having a first outer diameter and a second outer diameter that is greater than the first outer diameter, and wherein the diameter of the inner bore is greater than the first outer diameter and less than the second outer diameter.

3. In combination, a plunger and seal-carrying sleeve, the plunger comprising:
    a cylindrical body, at least a portion of the body being in one piece with more than one circumferential exterior seal groove; and
    replaceable annular seals positioned in selected ones of the seal grooves; and
    the seal carrying sleeve comprising:
    a tubular body having an outer surface defining a seal-carrying surface and an inner surface defining an inner bore, the diameter of the inner bore being greater than the outer diameter of cylindrical body of the plunger; and
    more than one plunger seal positioned on the seal-carrying surface, the plunger seal being adapted to be installed in the circumferential exterior seal grooves.

4. The combination of claim 3, wherein the plunger seal has an outer surface having a first outer diameter and a second outer diameter that is greater than the first outer diameter, and wherein the diameter of the inner bore is greater than the first outer diameter and less than the second outer diameter.

5. A seal installation tool for well plungers, comprising:
    a seal replacement cartridge carrying a plurality of annular replacement seals, the seal replacement cartridge having a cylindrical body with an interior surface defining an interior bore and an exterior surface;
    each of the plurality of annular seals being expanded onto the exterior surface of the body;
    the interior bore of the body accommodating a well plunger in overlying relation.

6. The seal installation tool of claim 5, wherein the interior bore of the body has a diameter that is greater than the outer diameter of the well plunger equipped with exterior seals needing replacement but less than the outer diameter of the well plunger with exterior seals not needing replacement, such that the interior bore of the body serves as a wear gauge to indicate when seals have been worn to such an extent as to require replacing.

* * * * *